United States Patent [19]

Killop

[11] Patent Number: 4,520,540
[45] Date of Patent: Jun. 4, 1985

[54] FIXTURE FOR GRINDING RACKS

[75] Inventor: James T. Killop, Warren, Mich.

[73] Assignee: Anderson-Cook, Inc., Fraser, Mich.

[21] Appl. No.: 478,897

[22] Filed: Mar. 25, 1983

Related U.S. Application Data

[62] Division of Ser. No. 237,240, Feb. 23, 1981.

[51] Int. Cl.³ .................. B24B 39/00; B24B 19/00
[52] U.S. Cl. .................... 29/90 B; 51/218 R
[58] Field of Search ............ 269/246, 249; 51/217 R, 51/218 P, 218 R, 221 BS; 72/88; 29/90

[56] References Cited

U.S. PATENT DOCUMENTS

| | | | |
|---|---|---|---|
| 2,371,515 | 3/1943 | Gorman | 51/218 R |
| 2,997,821 | 8/1961 | Dixon et al. | 51/218 R |
| 3,997,152 | 12/1976 | Sass et al. | 269/249 |
| 4,208,773 | 6/1980 | Killop | 72/88 |
| 4,270,375 | 6/1981 | Jungesjo | 72/88 |

FOREIGN PATENT DOCUMENTS

| | | | |
|---|---|---|---|
| 231521 | 2/1911 | Fed. Rep. of Germany | 269/249 |
| 332452 | 10/1903 | France | 269/249 |
| 1547101 | 6/1977 | United Kingdom | 269/249 |

Primary Examiner—Paul A. Bell
Assistant Examiner—Paul M. Heyrana
Attorney, Agent, or Firm—Reising, Ethington, Barnard, Perry & Milton

[57] ABSTRACT

A rack (12,14) for burnishing toothed gears (16) in cooperation with another like rack so as to provide accentuated axial crowns on the burnished teeth is disclosed as having a unitary body (42) of an elongated shape with leading and trailing ends (44,46) and a toothed forming face (48) extending between the ends. The toothed forming face (48) includes a leading section a of teeth that extend parallel to a mounting surface (54) of the rack body and at least one section of inclined teeth (50) preferably embodied by an intermediate section b and a trailing section c. A fixture (60) for grinding the inclined tooth sections b and c on a pair of cooperable racks (12,14) includes a pair of inclined support surfaces (66,68) and a clamp (70) for clamping the rack bodies during the inclined tooth grinding.

5 Claims, 10 Drawing Figures

FIXTURE FOR GRINDING RACKS

This application is a division of application Ser. No. 237,240, filed Feb. 23, 1981.

TECHNICAL FIELD

This invention relates to burnishing of toothed power transmission members, i.e. toothed gears, by elongated toothed racks.

BACKGROUND ART

The U.S. patent of Anderson U.S. Pat. No. 4,080,699, which is assigned to the assignee of the present invention, discloses apparatus and a method for burnishing gears by a pair of spaced gear racks having toothed faces that oppose each other so as to mesh with a toothed gear therebetween during driven rack movement. Meshing of the rack and gear teeth provides the sole rotational support for the gear during the rack movement as the harder rack teeth concomitantly burnish the softer gear teeth. Very good results are achieved in performing the burnishing operation by virtue of the manner in which the meshing rack and gear teeth provide the rotational support for the gear during the burnishing. It is believed that the superior results are achieved due to the freedom of the axis of gear rotation to move with respect to the racks as the rack teeth engage defects on the gear teeth.

U.S. Pat. No. 4,208,773, which is also assigned to the assignee of the present invention, discloses a toothed burnishing rack that is capable of burnishing toothed gears such that each burnished gear tooth has accentuated axial crowns intermediate the axial ends of the tooth. The axial crowns are in the range of about four to seven ten-thousandths of an inch or greater in order to enhance gear performance and durability while doing so without excessively increasing the cost of the gear. To provide the axial crowns, the burnishing rack includes a toothed forming face having leading and trailing sections with one of the sections, preferably the trailing section, slightly inclined with respect to the other section in a lateral direction along the elongated length of the rack. In the preferred embodiment disclosed, the inclination of the one section of the toothed face with respect to the other section thereof is provided by making the rack in separate pieces and grinding a mounting surface on one piece to a slight inclination in a lateral direction along the length thereof with respect to its oppositely facing toothed face section. Mounting of the two pieces on a flat base positions the toothed face section on the one ground piece in a slight inclination with respect to the toothed face section of the other piece. Two such racks cooperate with each other to burnish gear teeth in the manner described above.

DISCLOSURE OF INVENTION

An object of the present invention is to provide a rack capable of burnishing toothed gears with accentuated axial crowns in cooperation with another like rack and having a high strength construction that is economical to manufacture.

A rack for burnishing toothed gears in accordance with the invention includes a unitary body of an elongated shape having leading and trailing ends and also includes a toothed forming face extending between its ends. The toothed forming face includes at least a leading section located adjacent the leading end of the unitary body and a trailing section located adjacent the trailing end of the unitary body. One of the sections of the toothed face is slightly inclined with respect to the other section in a lateral direction along the elongated length of the unitary body so as to provide each burnished gear tooth with accentuated axial crowns intermediate the axial ends of the tooth.

In the preferred construction, the toothed face of the unitary body also includes an intermediate section located between the leading and trailing sections. This intermediate section of the toothed face is slightly inclined in a lateral direction along the elongated length of the unitary body with an opposite inclination as the one section from the other section.

The unitary body of the burnishing rack includes a flat mounting surface that faces in the opposite direction as the toothed face to provide mounting of a rack on a machine slide. A pair of parallel side walls of the unitary body extend in a perpendicular relationship from the mounting surface to the toothed face. At the leading end of the rack, the leading section of the toothed face extends parallel to the mounting surface. Both the intermediate and trailing sections of the toothed face are slightly inclined with respect to the leading section in a lateral direction along the elongated length of the body with opposite inclinations as each other from the leading section. Symmetrical crowns of the burnished gear teeth are provided by inclining the intermediate and trailing sections of the toothed face in opposite directions from the leading section the same angular extent as each other.

A fixture constructed in accordance with the invention holds a cooperable pair of the unitary rack blanks during grinding of the inclined sections of their toothed faces. The fixture includes a base having a lower surface and a pair of upwardly facing support surfaces inclined with respect to the lower surface the same angular extent as each other. A clamp of the fixture provides clamping of the pair of rack blanks on the base with the mounting surfaces thereof respectively engaged with the pair of inclined support surfaces. Grinding of the inclined teeth is performed on both rack blanks by feeding of a rotating grinding wheel parallel to the lower surface of the base.

In its preferred construction, the fixture has its pair of support surfaces inclined in the same direction as each other in an adjacent relationship. At a juncture of the pair of inclined support surfaces, one of the support surfaces includes an adjacent upper end and the other support surface includes an adjacent lower end that is positioned below the upper end of the one surface.

A pair of side walls of the fixture extend upwardly from the base in a spaced relationship to each other with the inclined support surfaces located between the side walls. One of the side walls includes a clamping surface, and the other side wall has a clamp mounted thereon such that the pair of unitary rack blanks to be ground are engaged with each other and forced by the clamp against the clamping surface of the one side wall in a clamping relationship.

Secure clamping of the pair of unitary rack blanks during grinding is achieved by the preferred construction of the fixture disclosed wherein the clamping surface on the one side wall extends perpendicular to the adjacent inclined support surface which has a lower end adjacent the right angle juncture thereof and, as previously mentioned, its upper end adjacent the juncture of the two support surfaces. The other inclined support surface whose lower end is located adjacent the juncture of the support surfaces also has an upper end located toward the other side wall on which the clamp is mounted. Ease of clamping and unclamping as well as secure clamping of the unitary rack blanks by the fixture is achieved by use of a threaded clamp including a threaded clamp member supported on the other side wall for movement toward and away from the clamping surface on the one side wall.

The inclination of the inclined teeth on a pair of cooperable unitary racks in accordance with the invention does not have to be particularly great in order to provide accentuated axial crowns on gear teeth burnished between the racks. For example, an inclination of $2\frac{1}{2}°$ is sufficient so that each opposite side of the tooth has an axial crown in the range of about four to seven ten-thousandths of an inch or greater. Also, the teeth of the toothed face can be ground to burnish not only straight spur gear teeth but angled helical gear teeth as well.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
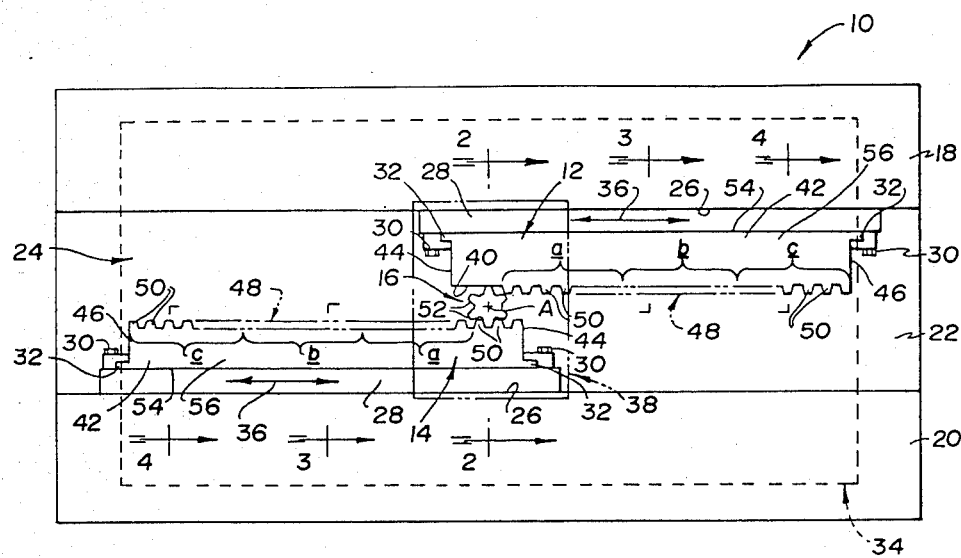
FIG. 1 is a front elevation view of a machine that includes a cooperative pair of burnishing racks each of which is constructed in accordance with the present invention.

Referring to FIG. 1 of the drawings, a gear burnishing machine indicated generally by reference numeral 10 utilizes a pair of upper and lower burnishing racks 12 and 14, each of which has a unitary construction in accordance with the present invention. Burnishing racks 12 and 14 cooperate to burnish a toothed gear 16 during operation of the machine. Upper and lower bases 18 and 20 of the machine 10 are interconnected by a vertically extending connecting portion 22 and extend forwardly therefrom to define a workspace 24 in which the burnishing is performed. Conventional slideways 26 on the upper and lower bases 18 and 20 support associated slides 28 on which the racks 12 and 14 are mounted. Bolted clamps 30 secure flanges 32 at the ends of the racks 12 and 14 to the associated slides 28 for movement therewith along the slideways 26. A schematically indicated drive mechanism 34 moves the slides 28 and the racks 12 and 14 mounted thereon in a reciprocal manner as illustrated by arrows 36 such that the racks mesh with the toothed gear 16 to perform the burnishing operation. One type of drive mechanism which may be utilized to drive the slides 28 is disclosed by the U.S. patent of Anderson U.S. Pat. No. 3,793,866 which is assigned to the assignee of the present invention.

A schematically indicated loader 38 initially loads a gear 16 to be burnished with the racks 12 and 14 positioned in their end-to-end relationship shown. One loader which may be utilized is disclosed by the U.S. patent of Roth U.S. Pat. No. 4,206,535 which is also assigned to the assignee of the present invention. As the loading is performed, gear 16 is positioned between the upper and lower racks 12 and 14 adjacent a leading flat 40 of the upper rack and in meshing engagement with the lower rack. Initial driving of the racks 12 and 14 toward the left and the right, respectively, first meshes the toothed gear 16 with the upper rack 12 such that meshing of rack and gear teeth provides the sole rotational support of the gear about its axis A while the harder rack teeth burnish the softer gear teeth as disclosed in the aforementioned patent of Anderson U.S. Pat. No. 4,080,699. Driving of the upper and lower racks 12 and 14 continues toward the left and the right, respectively, into an overlapping relationship and ultimately to a position where their right and left ends are located adjacent each other, and the drive mechanism then reverses the direction of movement to drive the racks back to the initial position shown for unloading of the burnished gear 16 by the loader 38.

With combined reference to FIGS. 1 through 4, each of the upper and lower racks 12 and 14 has a unitary body 42 made of a suitable tool steel with an elongated shape having leading and trailing ends 44 and 46, respectively. Each rack 12 and 14 has a toothed face 48 that extends between its leading and trailing ends 44 and 46, respectively, and has teeth 50 for meshing with teeth 52 of gear 16 to burnish the gear teeth during driven rack movement as described above. Each toothed face 48 includes a leading section a located adjacent the leading end 44 of the associated unitary body 42, an intermediate section b, and a trailing section c located adjacent the trailing end 46 of the unitary rack body. A flat mounting surface 54 of each rack body faces in the opposite direction as its toothed face and engages the associated machine slide 28 in the mounted relationship shown. A pair of parallel side walls 56 of each rack body extend in a perpendicular relationship from the mounting surface 54 thereof to its toothed face 48.

Figures 2, 3:
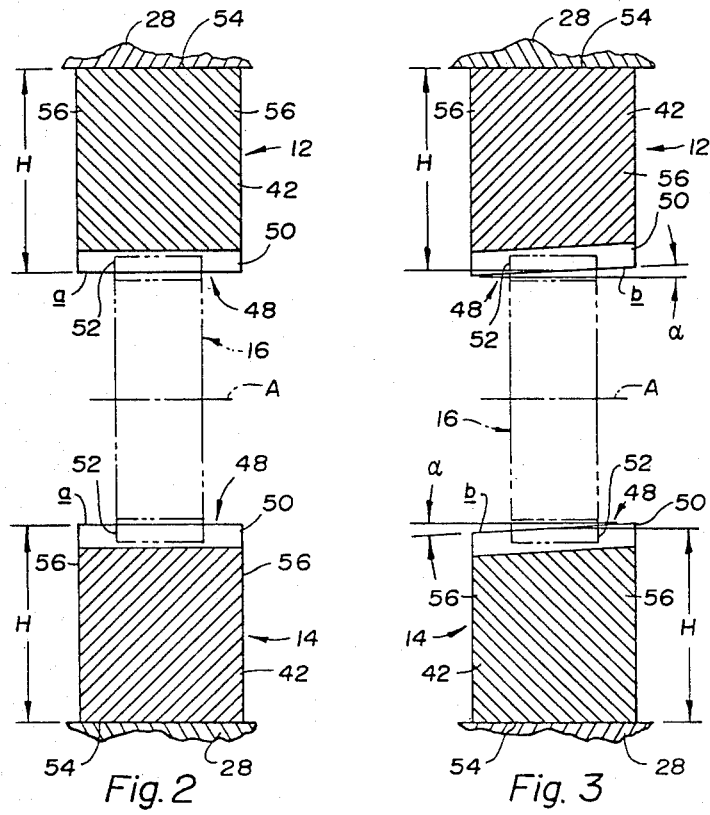
FIG. 2 is an elevation view taken in section along line 2—2 of FIG. 1 and illustrates leading sections of the burnishing racks.
FIG. 3 is an elevation view taken in section along line 3—3 of FIG. 1 and illustrates intermediate sections of the burnishing racks.

As seen in FIG. 2, the teeth 50 of the leading section a along each toothed face 48 extend parallel to the mounting surface 54 and to the gear axis A as the softer gear teeth 52 are initially burnished by the harder rack teeth 50 at the leading ends of the racks. Each rack body 42 has a height H between the mounting surface 54 and the tips of the teeth 50 along the leading section a of the toothed face 48. The height H of the rack body 42 and the spaced relationship between the toothed forming faces 48 of the upper and lower racks 12 and 14 are selected such that burnishing of the gear teeth 52 takes place as the meshing of the rack and gear teeth provides the sole rotary support for the gear 16.

With reference to FIG. 3, the teeth 50 of the intermediate section b along each toothed face 48 are slightly inclined by an angle $\alpha$ in a lateral direction along the elongated length of the unitary rack body with respect to the mounting surface 54 and with respect to the leading section a of the toothed face shown in FIG. 2. Each rack body has a height H between the mounting surface 54 and the tips of the teeth 50 along the inclined intermediate rack section b at a midpoint between the side walls 56 such that the axial ends of the gear teeth 52 are deformed to a greater extent than the intermediate portions therebetween in order to provide accentuated crowns on the oppositely facing sides of each gear tooth.

Figure 4:
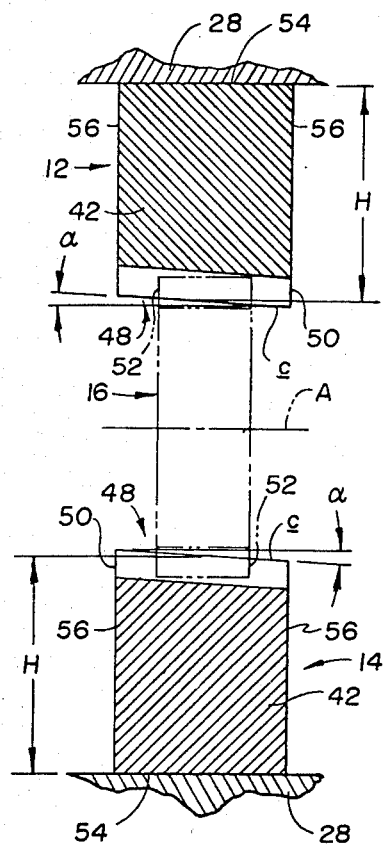
FIG. 4 is an elevation view taken in section along line 4—4 of FIG. 1 and illustrates trailing sections of the burnishing racks.

With reference to FIG. 4, the teeth 50 of the trailing rack section c along each toothed face 48 are inclined by an angle $\alpha$ in a lateral direction along the elongated length of the unitary rack body with respect to the mounting surface 54 and with respect to the leading section a of the toothed face in an opposite inclination as the inclined teeth along the intermediate section b of the toothed face. Each rack body 42 has a height H between the mounting surface 54 and the tips of the teeth 50 along the inclined trailing section c at the midpoint between the opposite side walls 56 such that the axial ends of the gear teeth 52 are also deformed to a greater extent than the intermediate portions therebetween in order to provide accentuated crowns on the oppositely facing sides of each gear tooth.

Figure 5:
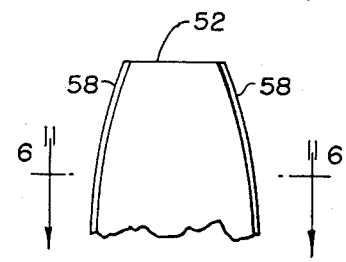
FIG. 5 is an end view illustrating a gear tooth that has been burnished by a pair of cooperative racks constructed in accordance with the invention such that the burnished gear tooth has accentuated axial crowns.
Figure 6:
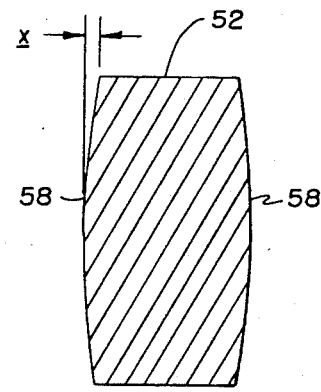
FIG. 6 is a sectional view of the burnished gear tooth taken along line 6—6 of FIG. 5 and further illustrates the accentuated axial crowns on opposite sides of the tooth.

It should be mentioned that the inclination of the intermediate and trailing sections b and c of the toothed forming faces 48, as illustrated in FIGS. 3 and 4, is exaggerated for purposes of illustration as the angle $\alpha$ is normally only on the order of about 2° to 3° in order to provide accentuated axial crowns 58 on the gear teeth 52 as illustrated in FIGS. 5 and 6. As seen in FIG. 6, the crowns 58 are accentuated by a distance x between the axial ends of the teeth and an axial midpoint between the ends. Increased gear tooth life is achieved when the distance x of the accentuated crowns is on the order of about four to seven ten-thousandths of an inch, which can be achieved with an angle $\alpha$ on the order of about 2° to 3°.

Figure 7:
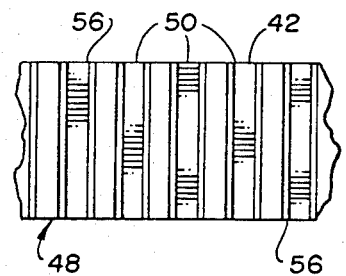
FIG. 7 is a partial plan view of one of the burnishing racks which has a toothed face whose teeth are ground to burnish straight spur gear teeth that extend parallel to the central axis of the associated gear.
Figure 8:
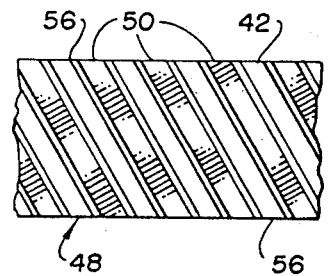
FIG. 8 is a partial plan view of another rack whose toothed face has teeth ground angularly with respect to the elongated length of the rack so as to burnish angled teeth of a helically toothed gear.

The unitary racks described above can have the teeth 50 thereof ground to burnish both spur gear teeth that extend parallel to the axis of gear rotation and helical gear teeth that extend angularly about the gear axis in a helical manner. As seen in the plan view of the toothed forming face 48 shown in FIG. 7, the teeth 50 are ground so as to extend perpendicular to the elongated length of the rack along which its driving takes place in order to burnish straight spur gear teeth. As seen in the plan view of the toothed forming face 48 shown in FIG. 8, the teeth 50 are ground so as to extend angularly with respect to the elongated length of the rack along which its driving takes place in order to provide burnishing of helical gear teeth. In either case, the rack sections with the inclined teeth provide the accentuated crowns of the teeth in the manner described above.

Figure 9:
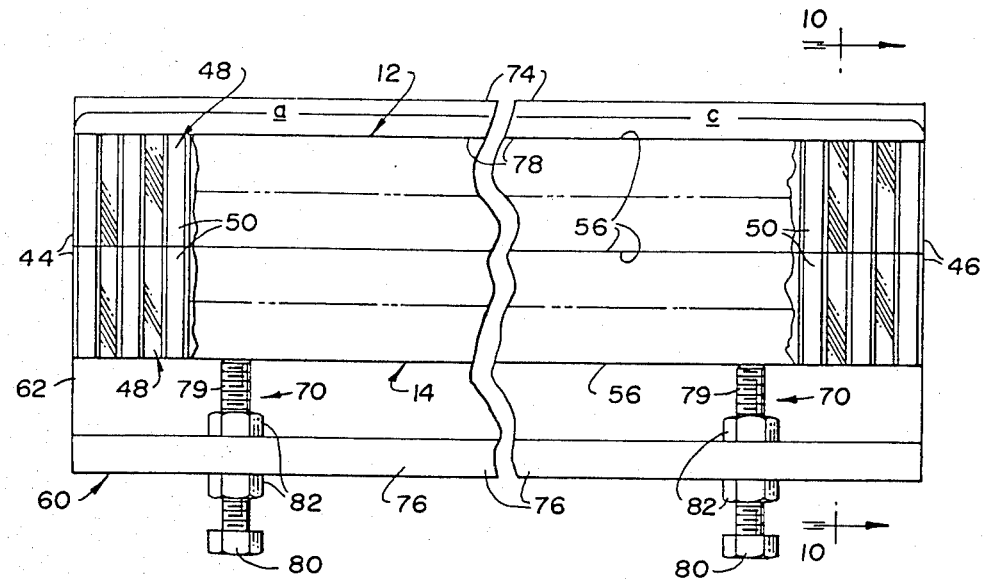
FIG. 9 is a plan view illustrating a fixture that is constructed in accordance with the invention to clamp a pair of the rack blanks for grinding of inclined teeth.
Figure 10:
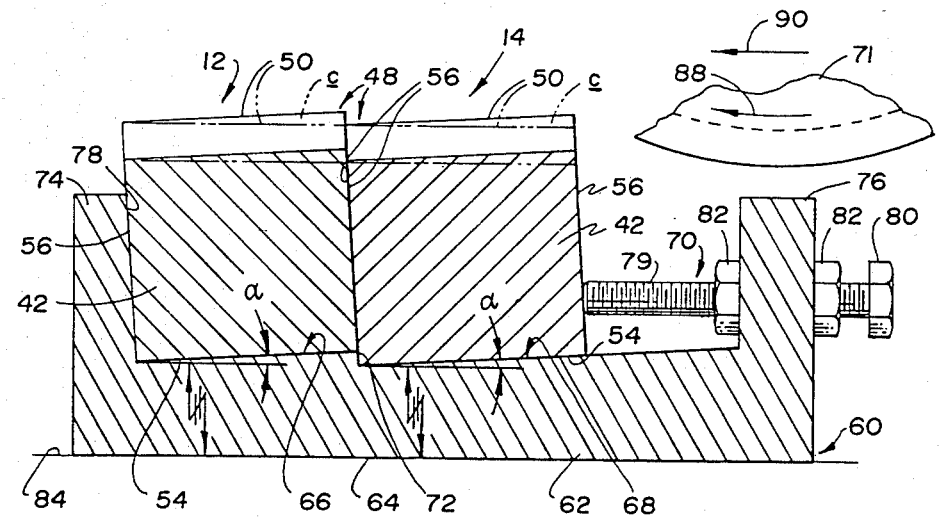
FIG. 10 is a sectional view taken along line 10—10 of FIG. 9 through the fixture and a pair of clamped rack blanks ready for grinding.

Referring to FIGS. 9 and 10, a fixture indicated generally by 60 is constructed in accordance with the invention to hold a pair of unitary rack blanks 12 and 14 during grinding of the inclined teeth of the intermediate and trailing sections b and c of the toothed faces 48, as described above. Fixture 60 includes a base 62 having a lower surface 64 and a pair of upwardly facing support surfaces 66 and 68 that are each inclined by an angle $\alpha$ with respect to the lower base surface 64. A clamp 70 of the fixture clamps the pair of unitary blanks 12 and 14 on the base 62 with the mounting surfaces 54 thereof respectively engaged with the inclined support surfaces 66 and 68 such that inclined teeth 50 can be ground on both blanks by feeding of a rotating grinding wheel 71 parallel to the lower surface 64 of the base.

As seen in FIG. 10, the support surfaces 66 and 68 of the fixture base 62 are inclined in the same direction as each other and have a juncture 72 adjacent which the side walls 56 of the two rack blanks to be ground engage each other. The one support surface 66 has an upper end adjacent the juncture 72, and the other support surface 68 has a lower end that is positioned adjacent the juncture of the inclined support surfaces at a location below the upper end of the support surface 66. Fixture 60 also includes a pair of spaced side walls 74 and 76 extending upwardly from the base 62 with the inclined support surfaces 66 and 68 located between the side walls. The one side wall 74 includes a clamping surface 78 that engages the side wall 56 of the adjacent rack blank 12, while the other side wall 76 mounts the clamp 70 which forces the rack blanks against the clamping surface on the one side wall. Clamp 70 is preferably of a threaded type including a threaded clamp member 79 received within an associated threaded hole in the side wall 76 and having a bolt head 80 at which torque is applied to provide rotation. Such rotation moves the clamp member 79 on side wall 76 toward and away from the clamping surface 78 on the side wall 74. Locknuts 82 received by the threaded clamp member 79 are located on opposite sides of the side wall 76 and are torqued into engagement therewith in order to lock the clamp member in its clamping position after appropriate rotation of the head 80. After grinding of the teeth 50, the locknuts 82 are rotated so as to move out of engagement with the side walls 76 in order to permit rotation of the clamp head 80 for unclamping of the ground racks.

The one inclined support surface 66 on the fixture base 62 shown in FIG. 10 has a lower end adjacent the lower end of the clamping surface 78 on the side wall 74. This clamping surface 78 extends at a slight inclination with respect to a perpendicular line to the lower base surface 64 so as to be perpendicular to the support surface 66 such that the adjacent rack blank 12 has its mounting surface 54 engaged with the support surface 66 and its left side wall 56 engaged with the clamping surface. The other support surface 68 has its lower end adjacent the juncture 72 positioned at the same elevation as the lower end of the support surface 66 adjacent the lower end of the clamping surface 78. Inclined support surface 68 also has an upper end located toward the side wall 76 from the juncture 72 of the two inclined support surfaces.

The racks 12 and 14 illustrated in FIGS. 9 and 10 are initially ground with teeth 50 extending parallel to the mounting surfaces 54. After such initial grinding, the inclined sections are ground by mounting the racks on the fixture 60 as shown in FIG. 10 with the fixture mounted on a table 84 of a grinding machine. The abrasive grinding wheel 71 of the grinding machine is rotated clockwise as shown by arrow 88 and fed parallel to the table 84 on which the lower base surface 64 rests, as shown by arrow 90, in order to grind the inclined teeth 50 of the trailing section c as illustrated by phantom line representation. After grinding of all of the inclined teeth 50 of the trailing section c, the rack blanks are unclamped from the fixture 60 and then repositioned end-for-end thereon to grind the inclined teeth 50 of the intermediate section b. Of course, the fixture 60 must be appropriately positioned on the table 84 with respect to the path of the grinding wheel movement for grinding of the inclined teeth 50 of both the intermediate and trailing sections of the toothed faces.

With combined reference to FIGS. 2, 3, and 4, the teeth 50 that extend parallel to the mounting surface 54 at the leading section a as shown in FIG. 2 have a tip height from the mounting surface that is equal to the average tip height of the inclined teeth 50 at the intermediate section b as shown in FIG. 3 and the trailing section c shown in FIG. 4. Thus, the initial teeth from which the inclined teeth are ground must have a greater height than the teeth of the leading section a. One way to grind the racks is to initially grind all of the teeth 50 with a height as shown in FIG. 10 equal to the height of the inclined teeth at their upper ends. The teeth of the leading section a can then be ground either before or after the grinding of the inclined teeth in the manner previously described.

While the best mode for carrying out the invention has herein been described in detail, those familiar with the art to which this invention relates will recognize various alternative designs and embodiments for practicing the invention as defined by the following claims.

What is claimed is:

1. A fixture for holding a pair of unitary blanks during grinding of toothed faces thereon, the fixture comprising: a base having a flat lower surface and a pair of upwardly facing support surfaces that are inclined with respect to the lower surface the same angular extent as each other; and a clamp for clamping a pair of unitary blanks on the base with the mounting surfaces thereof respectively engaged with the pair of inclined support surfaces such that inclined teeth can be ground on both blanks by feeding of a rotating grinding wheel parallel to the lower surface of the base.

2. A fixture as in claim 1 wherein the pair of support surfaces are inclined in the same direction as each other and have a juncture adjacent which one support surface includes an upper end and adjacent which the other support surface includes a lower end that is positioned below the upper end of said one surface.

3. A fixture as in claim 2 further including a pair of side walls extending upwardly from the base with the inclined support surfaces therebetween; one of the side walls including a clamping surface; and the other side wall having the clamp mounted thereon such that a pair of unitary blanks to be ground are forced by the clamp against the clamping surface of the one wall in a clamping relationship.

4. A fixture as in claim 3 wherein the clamp includes a threaded clamp member supported on said other side wall for movement toward and away from the clamping surface on said one side wall.

5. A fixture for holding a pair of unitary blanks during grinding of toothed faces thereon, the fixture comprising: a base; a pair of side walls extending upwardly from the base in a spaced relationship to each other; said base having a flat lower surface and a pair of upwardly facing support surfaces that are located adjacent each other between the side walls and inclined with respect to the lower surface in the same direction and for the same angular extent as each other; one of said support surfaces having a lower end adjacent one of the side walls and an upper end adjacent a juncture of the support surfaces; said other support surface having a lower end located adjacent the juncture of the support surfaces below the upper end of said one support surface and also having an upper end located toward the other side wall from the lower end thereof; said one side wall including a clamping surface that extends perpendicular to said one inclined support surface adjacent the lower end thereof; and a threaded clamp on the other side wall for forcing a pair of unitary blanks to be ground against the clamping surface on said one side wall in a clamping relationship with the blanks respectively supported on the pair of inclined support surfaces such that inclined teeth can be ground on both blanks by feeding of a rotating grinding wheel parallel to the lower surface of the base.

* * * * *